Sept. 2, 1941.   G. T. SOUTHGATE   2,254,247

ELECTRIC CONVERSION

Filed July 5, 1939   3 Sheets-Sheet 1

INVENTOR:
George T. Southgate,
by Potter, Pierce & Scheffler,
ATTORNEYS.

Sept. 2, 1941.  G. T. SOUTHGATE  2,254,247
ELECTRIC CONVERSION
Filed July 5, 1939  3 Sheets-Sheet 2

INVENTOR:
George T. Southgate,
by Potter, Pierce & Scheffler
ATTORNEYS.

Sept. 2, 1941.    G. T. SOUTHGATE    2,254,247
ELECTRIC CONVERSION
Filed July 5, 1939    3 Sheets-Sheet 3

INVENTOR:
George T. Southgate,
by Potter, Pierce & Scheffler,
ATTORNEYS.

Patented Sept. 2, 1941

2,254,247

UNITED STATES PATENT OFFICE 2,254,247

ELECTRIC CONVERSION

George T. Southgate, Forest Hills, Long Island, N. Y.

Application July 5, 1939, Serial No. 282,873

24 Claims. (Cl. 175—364)

This invention pertains to the conversion of electric power from alternating to direct currents and conversely, or from direct through alternating and back to direct currents; wherein numerous working voltages in a polyphase transformation are commutated in sequence by synchronously actuated contacts.

The transformer element of the converter includes windings that are divided into numerous transformer units on a core system in common, each "transformer unit" comprising a unitary assembly including at least one primary and one secondary coil (and preferably a tertiary coil), ferromagnetically coupled together with nearly zero flux leakage. The term "winding" will be used throughout this specification and the claims to designate one of the systems of coils of a given function (e. g. the primary winding), as distinguished from the individual coils or the coupled units thereof. The preferred construction for obtaining the desired close magnetic coupling takes the form of flat coils in coupled units separated by ferromagnetic teeth between central and lateral cores.

Magnetically and electrically these transformer units so cooperate that the magnetomotive forces of their currents jointly produce a field of travelling polarity. In turn this field induces in the windings, voltages equal in number of phases to the number of coil units.

The primary and secondary load currents so coact through the balancing magnetomotive forces of their unitarily coupled and otherwise specialized windings that when either the primary or the secondary load current is commutated to or from external direct current, no flux change in the transformer core results from the commutation. This coaction is more fully explained hereinafter.

This application is a continuation-in-part of my copending application Serial No. 75,080, filed April 18, 1936, "Electric power conversion, now Patent No. 2,165,309, issued July 11, 1939.

Objects of this invention are to provide methods of higher operative efficiency, and apparatus of simpler construction, than are now obtainable with rotary or vapor converters. Objects are to provide methods of and apparatus for electric conversion that are characterized by a stationary transformer having power windings divided into numerous unitary assemblies of closely coupled coils, and commutating mechanism associated with one or more of the windings; whereby high voltage or current ratios may be obtained in accordance with the choice of the number of unitary assemblies in a particular installation and the connection of the coils in the windings. Other objects are to provide methods of and apparatus for converting electric power by commutating the current flowing in one or both of two power windings of a transformer, and modifying the wave forms of the induced voltage by an alternating current flowing in a tertiary winding that is coupled closely to both power windings. An important object is to provide an electrical converter including a transformer having multiple windings and a commutator associated with at least one winding, the transformer designed being such that the commutation is effected with minimal sparking.

A further object is to provide a novel electrical converter and method of electric conversion between one power current and an alternating current of a given number of phases that is externally connected to the converter, the apparatus and method being characterized by increasing the number of phases within the electromagnetic structure of the converter by passing the alternating current through pairs of coils in vectorial zigzag, the coils of a pair being in series and the pairs interconnected either in parallel or in series to form a complete polyphase winding. More specifically, objects are to provide methods of and apparatus for conversion between electric currents flowing in the power windings of a stationary transformer in which the power source is partially or wholly relieved of wattless and harmonic currents by supplying such currents to a separate exciting winding.

With these and other objects in view, the invention comprises the novel method of conversion and the improved apparatus for its performance explained in these specifications in relation to typical embodiments and to the accompanying drawings illustrative thereof. It is to be understood that the invention is not limited to this exact disclosure, except as may be required by the claims. Similar reference numerals refer to similar parts throughout the drawings, whereof:

Figure 1:
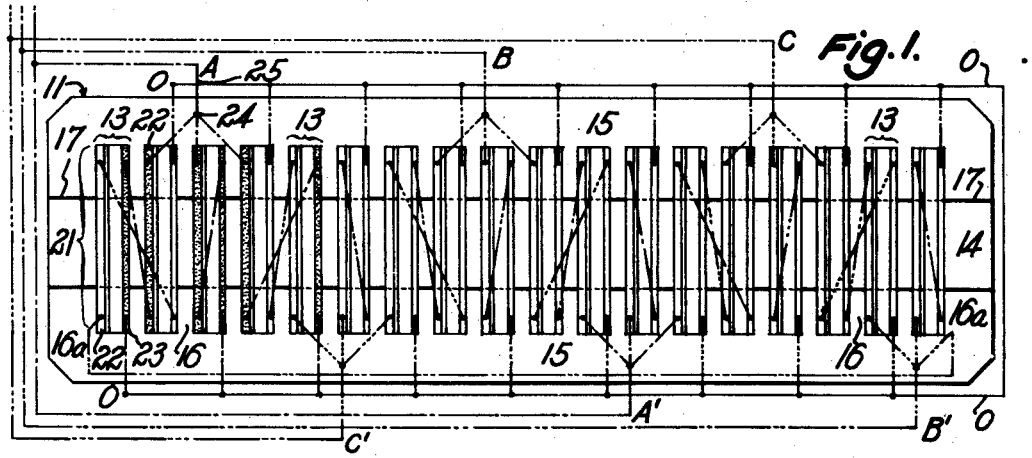
Fig. 1 is a plan view of an electric converter embodying the invention, the unitary assemblies of the transformer each including four coils and the circuit connections showing diagrammatically a parallel, zigzag connection of two coils of each assembly to form a polyphase winding, the circuit connections to the other coils being omitted for clarity.

In the drawings, the transformer assembly of the converter as a whole is identified by the reference numeral 11, and the commutative apparatus is identified by the numeral 12. The actuative elements of the commutative contactors are not shown as the specific construction forms no part of the present invention. Rotary commutation or vibratory commutation, such as described in my prior United States Patent No. 1,967,135 may be employed to obtain the required sequence and timing of the connections.

The coil assemblies of Figs. 1, 2, 3, 5 and 6 are identical and, as shown, each includes four coils of which two are included in the same power winding, one is in the other power winding, and the remaining coil is in a tertiary winding. For brevity and clarity, these embodiments of the invention will be described with reference to the conversion of power from alternating to direct current, i. e. alternating current is supplied to the "primary" winding and direct current is taken from the "secondary" winding through the commutator mechanism. The operation may be, however, an "inversion" or transfer of power from a direct-current to an alternating-current circuit. In fact, the converters of this invention, when used as the link between two powered systems of which one is direct-current and the other either direct or alternating-current, will transfer power in either direction in accordance with the relative magnitudes of the direct-current voltages involved.

The coil units 13, of which eighteen are employed in the illustrated construction, are distributed along a rectangular subdivided shell type of ferromagnetic core built up of laminated material such as silicon steel. The core includes a central section 14, Fig. 7, and outer core sections or yokes 15 of about one-half the width of the central section, with connecting teeth 16 between coil units and connecting teeth 16a at the ends of the transformer. The intermediate teeth 16 are relatively narrow because each one carries only a portion of the flux distributed over a travelling pole; but each end tooth 16a at certain times carries the maximum flux that passes to its mating yoke 15 and therefore is of the same width as the yoke. The windings may be multipolar or, as shown, bipolar. In the bipolar constructions, about one-half of the teeth 16, 16a are of north polarity at a given instant and the other half of south polarity, in varying degree according to an approximately sinusoidal distribution.

Figures 7, 8:
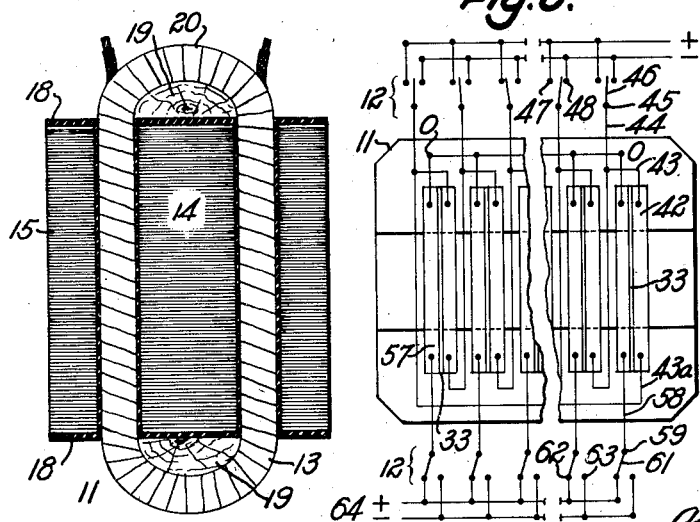
Fig. 7 is a vertical section through the transformer substantially on line 7—7 of Fig. 6.
Fig. 8 is a fragmentary plan diagram of a converter having two sets of commutative devices for direct-current conversion, the connections to the tertiary coils being omitted.

The core may be built up in any desired manner, for example by forming the central section 14 of rectangular strips, and the yokes 15 and teeth 16, 16a as serrated stampings that are inserted from the sides after the coil units are placed on the core section 14. Insulating strips 17 are pressed between the central core section and the teeth to form magnetic gaps that prevent marginal eddy currents in the laminations and, if sufficiently thin, are harmless and beneficial. As shown in Fig. 7, the laminations are held between insulative top and bottom clamping plates 18 upon which notched insulative blocks 19 are mounted to space the several coil unit assemblies 13.

Referring now to Fig. 1, the primary or alternating-current winding 21 is of the parallel, zigzag polyphase form fed from the wires A, B, C of a three-phase system. Two coils 22, 23 of each unit coil assembly are connected into the primary winding and, except for the six coil units serving as the starting points of a phase progression, the two coils of a unit are excited at different time phases. The two primary winding coils of the six starting units are in series with each other and, except for uniformity in construction and other minor conveniences, could be formed as a single coil. The coils 22, 23 of each unit are of an unequal number of turns but of uniform wire size, and the longer coil 22 is shown at the left with the shorter coil 23 at the right of each coil unit assembly. These primary coils of each unit exert jointly a magnetomotive force that is the sum of their separate forces. These summations are vectorial, joining the varying scalar magnitudes of the coil ampere-turns with the combinations of their phases of excitation.

In the eighteen-phase transformer chosen for example, each leg A, B or C of the illustrated three-phase supply contributes to the excitation of five units per pole, overlapping the excitation by the other supply phases. This will be readily seen by referring to a junction 24, which is served by its supply wire 25 of the A phase and which in turn supplies in parallel two series-connected coils in two units counted to the left of the junction, two series coils in the middle unit and two series-connected coils in two units to the right of the junction. It will also be seen that in this group of five units, the number of turns carrying current from the given supply leg increases from the left to the middle and diminishes to the right side. Thus we have in order per unit from left to right, one short coil 23, then one long coil 22, then (at the middle) one long and one short coil, then one long coil, and finally one short coil in the fifth of these units. In order to facilitate reading Fig. 1 with respect to this connection, the coils in the left-hand or A group have been made conspicuous by stippling; and in addition the wires of phases A and A' are drawn as single-dot chain lines, those of phases B and B' as double-dot chain lines, those of phases C and C' as triple-dot chain lines, and the neutral bus O is drawn in solid line.

Figure 4:
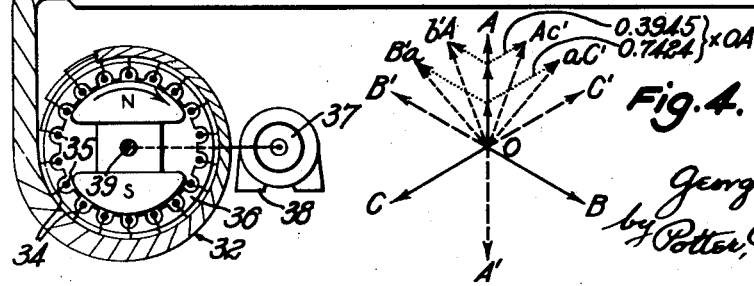
Fig. 4 is a vector diagram in explanation of the polyphase action of the zigzag windings.

The scalar as well as the phase relations of voltages, ampere-turns and fluxes in the coils of the above quintuple group are best understood by reference to Fig. 4. The three heavy, full-line vectors 120 degrees apart represent the three supply voltages from legs A, B and C through the corresponding coils of the transformer to the neutral bus O; and the three vectors A', B' and C' in long-dash lines show the voltages in oppositely connected coils at the middles of the reverse poles of the machines. Starting 40 degrees to the left of A, the full-length vector B'a is formed by adding a larger component from B' to a smaller one from A. Next, the vector b'A is formed by adding a smaller value from B' to a larger one from A. Then the vector A may be understood as formed by long and short elements in its own phase. Correspondingly, vector Ac' is formed from a long A magnitude and a short C' one, and vector aC' from a short A component and a long C' one. In like manner the remaining vectors may be accounted for.

Thus in this case of eighteen phases derived from three, only two lengths of zigzag components are required to make the full number of derived vectors. In addition the basic vectors A, C', B, A', C and B' require a third component length. Taking the basic and derived vectors as of unit length, each derived vector such as Ac' or aC' is formed from longer components of value 0.7424 and shorter ones of value 0.3945, compounded as shown in Fig. 4. The third length component, stated above as required in the basic vectors, preferably should be the difference between unity and the longer component, or 0.2576. These lengths correspond to the proportionate numbers of turns required in the longer and shorter coils of each quintuple group; since the induced voltage per turn is uniform throughout the symmetrical transformer with its uniformly travelling field polarity.

In like manner the ampere-turns of excitation contributed by each coil in the group of five units, are proportional to the number of turns in that coil. For, with reference to the zigzag paths, each coil is in series with another coil and their joint reactance is equal to that of each other pair. This includes also the non-zigzag or straight pairs in the basic phases. With equal reactances, the coil-pairs take equal exciting currents from the line, and thus the individual coils give ampere-turns proportionate to their numbers of turns.

Figure 2:
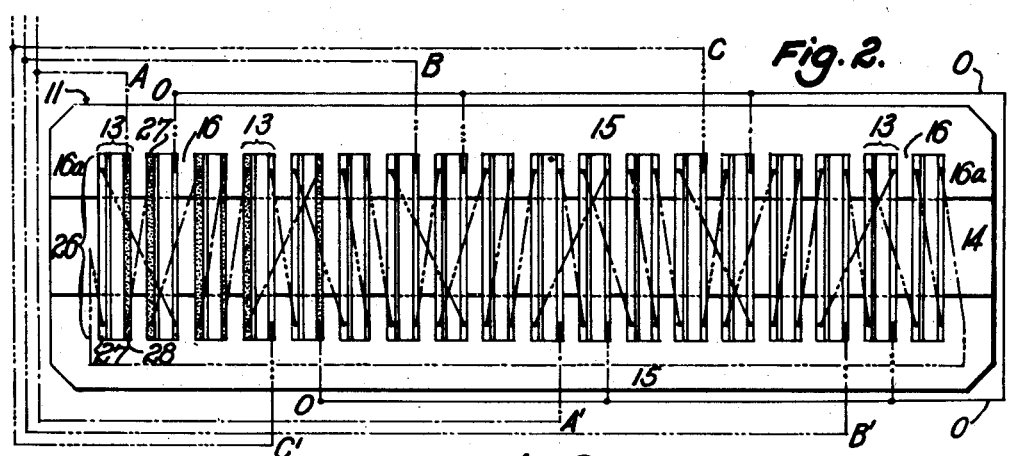
Fig. 2 is a similar plan view but showing a series connection of the coils in a zigzag polyphase winding at the alternating-current side of the converter.

In Fig. 2 is shown an alternating-current winding 26 of my improved converter resembling winding 21 in Fig. 1, with the exception that the six coils in a five-unit group of a given phase are all connected in series rather than in three parallel series pairs. From the stippling of the left-hand group, it will be seen that the sequence of the coils is the same as that in the corresponding coils of winding 21 in Fig. 1; i. e. from left to right, one short coil 28 in the first unit, one long coil 27 in the second, then a long and a short coil in the middle unit of the group, one long coil in the fourth unit, one short coil in the fifth unit, and out to the neutral O. This series winding 26, if made of coils of the same turns and wire-size as those in winding 21, would be suitable for treble the voltage and one-third the current on the alternating-current side. If the number of transformer phases were increased by extension of the method in Fig. 4 (as e. g. in larger converters), the voltage contrast for the two forms of winding would be further enhanced, giving a wide choice for commercial convenience.

While the three-phase external connections in Figs. 1 and 2 are completed in Y, they could as well be closed in delta. Likewise the transformer, with an appropriate number of units could be connected to a four-phase or any other polyphase power system.

Thus it will be understood that in converters embodying this invention, each of the multiplied phases or electromagnetic units 13 takes its equal and sequential part in the transformation. This applies to the excitation of the subdivided core resulting in the field of uniformly travelling polarity, and to the transfer of energy from the primary to the secondary winding. Accordingly, the load current taken (if primary) or given out (if secondary) by each of the coil pairs in winding 21 of Fig. 1, or by the series groups in winding 26 of Fig. 2, is the same as that in each other pair or group respectively. This is true whether the direct-current winding is of the parallel or series type (hereinafter described with reference to Figs. 5 and 6), and whether the operation be conversion or inversion; because these windings and their commutative systems are likewise symmetrical as hereinafter explained.

Figure 3:
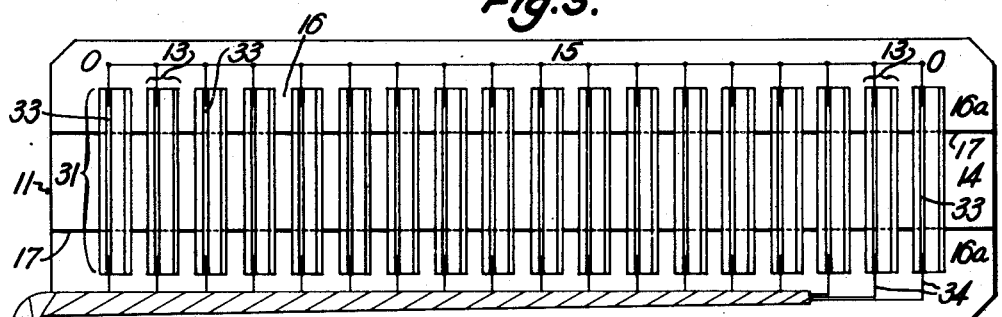
Fig. 3 is a plan view of the transformer with a diagrammatic illustration of an auxiliary synchronous condenser and its connections to the tertiary coils.

A preferred arrangement of a tertiary winding 31 of the converter is shown in Fig. 3, in combination with its synchronous condenser or exciter 32. The transformer tertiary winding 31 formed of coils 33, is star-connected to the neutral O—O; a lead 34 is brought from each coil 33 to one of the numerous (in the example eighteen) phases or coils 35 in the armature 36 of the exciter 32, and the back-turns of the armature to their own neutral, not shown.

The field N—S of the exciter 32 rotates at synchronous speed (e. g. at 3600 R. P. M. in Fig. 3 if the converter is operated at 60 cycles. Its structure may comprise a permanent magnet with pole pieces, as here diagrammed; or it may be an electromagnet supplied with direct current through slip rings. With proper facilities for starting, such as its own squirrel cage (not shown) or the rotor 37 of the motor 38 coupled to its shaft 39, a permanent magnet of one of the modern alloys is practical for the field, and has the advantage of requiring no exciting current.

The main functions of the auxiliary machine 32 and the tertiary winding 31 are: to supply the converter with exciting current, and to modify the wave-form of voltage induced in the transformer coils to one that is advantageous in commutation on a direct-current side of the converter. The function of voltage wave-form modification will be explained after the description of Fig. 5.

The function of excitation by an auxiliary machine 32 is worthwhile wherever it is desired to relieve the power system of supplying transformer magnetizing current. It is actually necessary in cases where the operation is inversion without the paralleling of condensive or synchronous generative capacity on the alternating-current side, or where it is conversion from direct current to direct current. In either of such cases the speed of exciter 32 can be held at a value giving a desired internal frequency in the transformer, by employing as the motor 38 one having a definite speed characteristic such as a shunt or differential direct-current machine or an induction or synchronous alternating-current motor, and electrically floating the motor 38 on its power-supplying system. Thus floated, the motor supplies power only in the amount of the losses in the exciting system 32—33—34; since the main current flowing therein is wattless.

Figure 5:
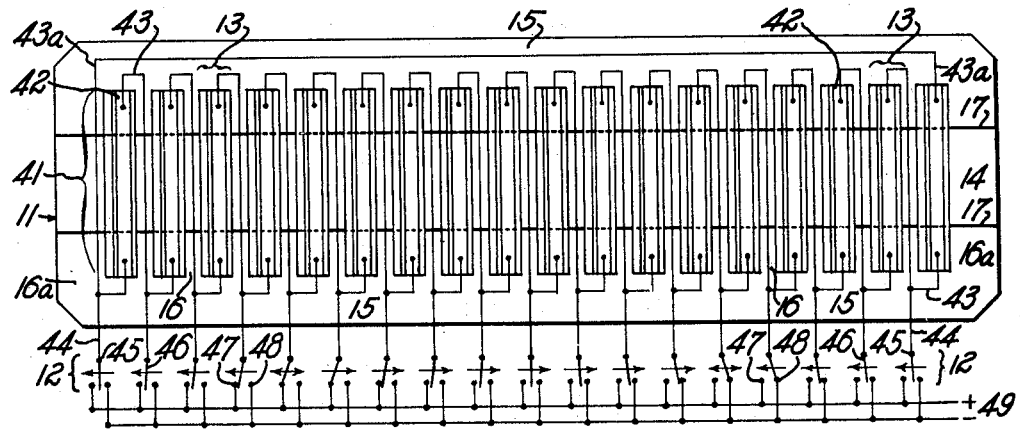
Fig. 5 is a plan view, similar to Figs. 1 to 3, but showing the interconnections of a coil of each unitary assembly as a series, reentrant winding, and the commutative contacting elements on a direct-current side of the converter.

The circuit connections of one type of secondary winding 41 are shown in Fig. 5. The coils 42 of the several unit assemblies are connected together in the simple manner of a Gramme ring by means of the Z-shaped leads 43 and the end-closing lead 43a. The leads 43 and 43a are connected by means of the tap-leads 44 to the diagrammatically shown commutator 12 at the hinge-points 45. By actuative means, not shown, the moving elements 46 of the contactors are made to connect the tap-leads 44 in uniform sequence, through the left and right contacts 47 and 48 to the direct-current busses +49 and —49.

As in ordinary commutation, the connection of each element 46 selectively to each of its coactive contacts 47 and 48 is made for a brief and determined period; and this contact of a given element 46 overlaps for a definite and still briefer period the similar contacting of the next element 46 with its coactive element. The overlap produces the commutative shortcircuit of a coil 42 that is familiar in direct-current dynamo principles. The angular disposition of the eighteen diagrammatic blades 46 in Fig. 5 shows for a given instant the positive and negative contacting and the approaches thereto.

In this low-reactance converter, the commutative shortcircuit can be made very brief; because the time of dying down and reversed building up of the current in each coil 42 is reduced to a small part of that, for example, in ordinary generators. In order that the benefit of the low coil leakage reactance be not compromised, the tap-leads 44 should either be short, or if long should be closely cabled together.

Figure 10:
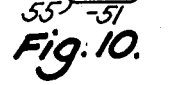

The ideal cycle of current in a coil 42 of the winding 41 is approximated in Fig. 10. Here the flat top +51 corresponds to the period when the coil is in series with others between commutating positions and thus takes a continuous current of half the total to or from this bipolar winding. At the point 52 commutative shortcircuit begins, and the current quickly dies to zero at point 53 because of the smallness of energy stored in leakage inductance. At point 54 the short-circuit of overlap is removed, and the coil current quickly rises in the opposite direction to the flat —51, of the former value, at point 55.

Since the coil inductance is not absolute zero, there will be a spark in the contactor at time 54, of magnitude tiny or substantial according to the current and the voltage per coil. With an improved contactor this sparking is a minor problem, even at relatively high voltages.

The commutated coil 42, closely linked to its long and short coils in the alternating-current winding 21 or 26, must receive such cooperation from these other coils that no substantial flux change will be produced in the transformer core because of the commutation. To that end the ampere-turns of each commutated coil 42 must be matched throughout its cycle by equal and opposite ampere-turns within its own unit. Such balancing of secondary ampere-turns by those in the primary is indeed realized in all of the examples herein. In the case of Fig. 1 or 2 matched with Fig. 5, the effective ampere-turns on the alternating-current side of a unit are the combined values from the two corresponding coils in that unit. Being closely coupled with these two coils, each coil 42 must be balanced by the load ampere-turns in these other coils as if they were a single coil. If the number of phases of transformation were the same per pole as those of supply (e. g. three) there would need be only one coil in the alternating-current winding per coil on the commutated side; and the balancing of secondary by primary load ampere-turns would appear as obvious as in a simple transformer. This balancing is no less the case in the improved converter with its multiplied phases of transformation; because the two contributing coils on the alternating-current side are free to draw their load currents from their respective supply phases in such amounts that they will add up at any instant to the current in coil 42, times the ratio of transformation.

The above coaction of primary and secondary load currents may be corroborated by that of the corresponding voltages; since with its direct-current external service the winding 41 has unity power factor and causes the same to be true as to the load current in the alternating-current winding. The induced voltage in a coil 42 being in phase with the vector sum of those in its two coacting coils, the overall current and voltage vectors of a unit 13 are co-angular.

This coincidence of phasing persists through the commutative event; and in addition the load currents in both sides of a unit take the same wave-form heretofore outlined as caused by the commutation, with its flat tops 51 and its low shoulder from point 53 to 54. On the alternating-current side the flat wave becomes softened toward a sinusoid in the power mains A, B and C, whether this side is primary or secondary and whether it be winding 21 or winding 26.

During commutation of a coil 42 it is desirable, especially in high-voltage direct-current operation, that the induced voltage in the coil have a low root-mean-square value so that it will cause little ohmic loss by shortcircuit in the coil 42, its leads 43, 44 and the commutative contactor. Such low R. M. S. voltage during commutation is attained in my invention by the coaction of tertiary winding 31 and exciter 32, with its specially shaped pole pieces on magnet N—S. The voltage induced in each armature coil 35 is substantially of the desired form shown in Fig. 10. This flat-topped, low shouldered voltage is a complex of the fundamental with numerous harmonics up to relatively high frequencies; but the pole-shapes on magnet N—S required for its production are readily designed by graphic layout and experimental checking.

As in the exciting function heretofore explained, the voltage wave-modifying function of auxiliary machine 32 is externally wattless; although there is an internal intra-cycle transfer of power from the current of fundamental frequency to the harmonic exciting currents. That is to say, the tertiary winding 31 furnishes a small power current at fundamental frequency to the exciter 32 for its propulsion as in other synchronous condensers, and receives in accordance with the field strength and field form of the machine 32 some or all of the wattless current of excitation of the transformer, back through winding 31. The exciting current thus returned to the transformer 11 includes not only the fundamental frequency but also the harmonics corresponding to the desired wave-form of voltage induction in the transformer coils.

In supplying wattless current to the transformer for its excitation and in the modified wave-form, the exciter 32 is not called upon to deliver any power through the transformer to the secondary external system. For, as previously outlined, the transformer direct-current winding, in conducting its flat-topped current occasioned by the commutation, causes this same wave-form of power current to flow in each coil of its closely coupled alternating-current winding. It thus transfers by induction all of the power involved, without interference by the tertiary winding except in the prevention of large commutative shortcircuit currents.

Figure 6:
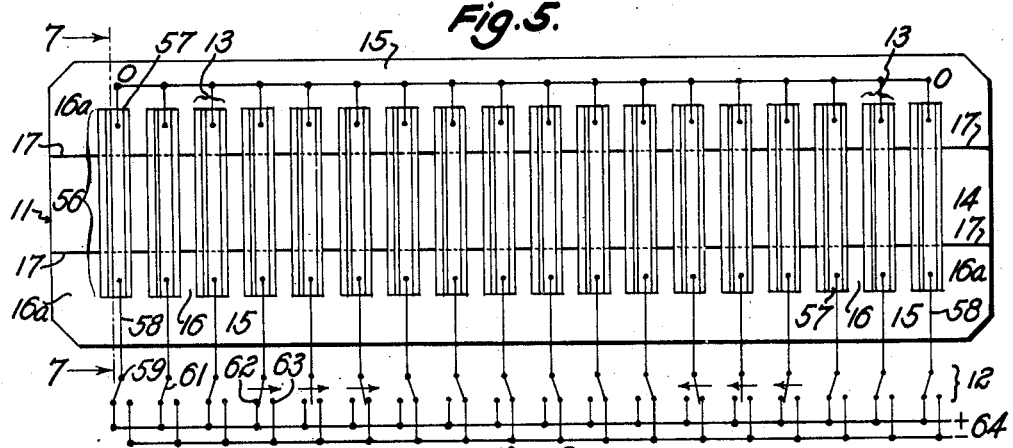
Fig. 6 is a plan view, similar to Fig. 5, but showing a parallel winding and contacting system on a direct-current side of the converter.

In the converter of Fig. 6, the winding 56 is formed of coils 57 that are star-connected to the neutral O—O and joined by leads 58 to the commutative system 12 that is so actuated that the coils cooperate in parallel instead of series during their working periods. The contactive operation is commutative in the sense that each coil is reversed in connection while its induced voltage passes through zero, but it does not include commutative short circuit of the coil. These coils 57 correspond to the coils 42 of Fig. 5, and may be of the same construction but, for clarity, different reference numerals are employed to identify the coils of the series-connected and parallel-connected windings.

Specifically, each coil 57, through lead 58 is connected to junction 59 with the moving contact element 61. This element, diagrammed as a blade, contacts alternately with coacting contacts 62 and 63 and thereby is connected selectively with power buses +64 and —64, respectively. Here, in distinction from the series system of Fig. 5, the contact duration in either direction is not brief, but may be as little under a half-cycle of the transformation as will permit the element 61 to make its periodic movement from one side to the other. Accordingly, in Fig. 6 most of the elements 61 are shown at rest in contact with 62 or 63, with only a few in groups 180 electrical degrees apart, in motion.

In the operation of winding 56, the tertiary winding 31 and its exciter 32 again play beneficent parts, additional to the excitation at fundamental frequency. They are those of giving the contacting a break under conditions that prevent substantial sparking, and of flattening the induced voltage in coils 57 so that they may cooperate in parallel without substantial interchange currents through the major parts of their cycles.

Figure 9:
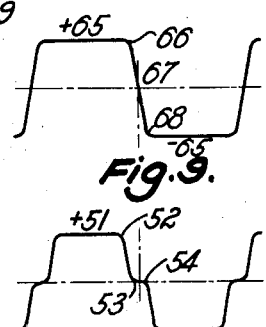
Figs. 9 and 10 are diagrams of voltage wave forms.

Fig. 9 approximates the voltage wave-form for coils 57 that would be ideal from the viewpoint alone of current non-interchange. During the voltage period +65 a coil is in parallel with others of equal induced voltage and equal circuit resistance. The coils therefore share their currents about equally. At moment 66 a coil starts to lose its induced voltage which falls through zero at moment 67 and reaches the full value in the reverse direction at moment 68. If it remains connected an interchange current starts in this coil, because the other coils have not lost any of their full, flat-topped voltage. Accordingly, the contactor element 61 should part with member 62 at moment 66. Conversely, it should not begin contact with member 63 before moment 68; because such premature contact will cause a brief and useless interchange current. Opening after point 66 will cause a spark unless the operating voltage be low, but here again the low leakage reactance of coil units 13 will minimize the inductive storage and the sparking. In fact, at low voltage the ohmic loss of interchange current may be more important than the inductive.

The shoulder 53—54 in the graph of Fig. 10 does not impair this shape in lieu of that in Fig. 9, for use with the parallel winding 56, provided the idle period 52—55 is not materially greater than that from 66 to 68. Accordingly the wave-shape of Fig. 10 may be used with winding 56 wherever it would serve a second purpose, as in the case of a transfer of power between two direct-current circuits.

Such a transfer may be effected with a converter of Fig. 8, in which a winding 41, (such as shown in Fig. 5) is combined with a winding 56 (such as shown in Fig. 6) and with a tertiary winding 31 (represented by its coils 33), to enable the converter to operate under improved conditions as a transformer from direct current to direct current. Herein the coils 33 of the tertiary winding 31 are to be understood as connected to the exciter 32 in the manner of Fig. 3. The reference numerals of coils, connections, contacts, etc. are the same as in Figs. 5 and 6 for the respective windings.

In this direct-current transformer, if the lower, parallel winding be the primary and the upper series system the secondary, as in stepping up to transmission tension, the generator voltage (assumed approximately sinusoidal) would need the assistance of the tertiary-excitative system to produce the flat-topped induced voltage required on the parallel-wound input side. It would also require the low-shouldered voltage wave-form of Fig. 10 for good commutation on the high-tension, series-wound side. Accordingly, the excitative system should be made to give the voltage graph combining the flat top with low shoulders, as in Fig. 10. If the primary and secondary functions of the two power windings were interchanged this tertiary wave-modifying provision should still be made.

Figure 11:
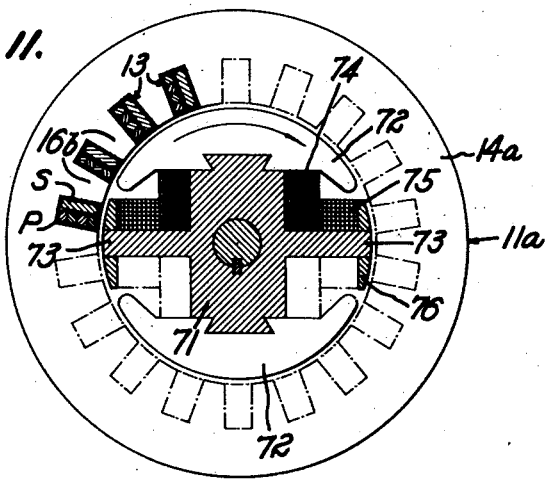
Figs. 11 and 12 are transverse sections through transformers of circular form having rotors for magnetic excitation and wave-form modification.
Figure 12:
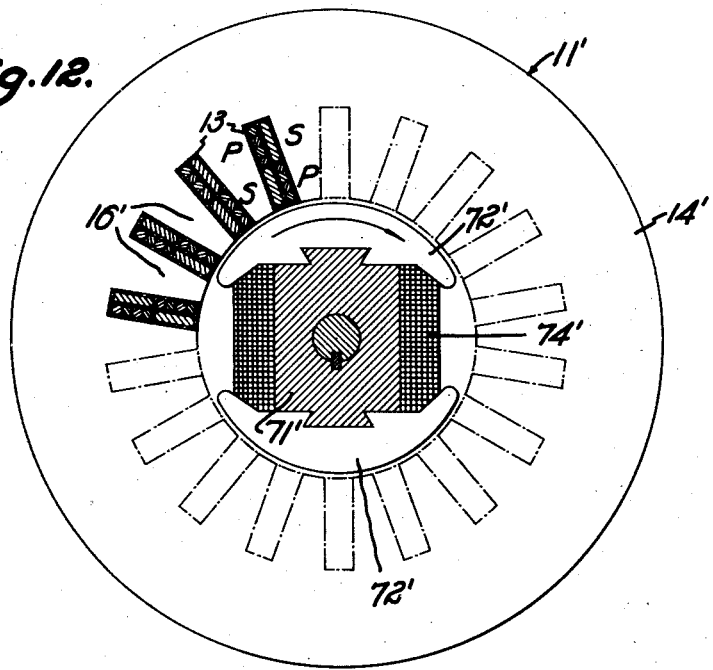

Modifications of the improved converter are shown in Figs. 11 and 12 wherein the functions of the tertiary winding and its exciter are combined in a synchronous rotary system directly adjunctive to the transformer. For this purpose the transformer is made circular and adapted as a stator to cooperate with the auxiliary member as a rotor. The commutative arrangement is not shown, being diagrammatically similar to system 12 in Fig. 5 or Fig. 6.

In Fig. 11, the transformer 11a comprises the coil units 13 mounted in the laminated stator core 14a and separated by teeth 16b. The magnetic return circuit of the stator is through a rotor comprising a core 71 having main poles 72 and interpoles 73. It is upon this return circuit that the excitative function is so conveniently superimposed.

The main poles are excited by a direct-current coil 74 and the interpoles by a direct-current coil 75, through slip rings not shown. The main poles are excited by a fixed voltage, as from across a low voltage, direct-current side of the converter, and the interpoles are magnetized by current proportional to the direct current output or input to the converter, as by connecting the coil 75 in series with the direct-current load. The function of the interpoles is to add the last operative refinement to the commutation by superimposing upon the induced voltage of each coil a commutating voltage proportional to the current being reversed. Thus in operating at very high direct-current voltages, the interpoles will compensate for any lack of closeness of coupling because of thick insulation.

Each unit 13 of the stator comprises primary and secondary coil-sides, marked P and S respectively. No tertiary winding is included, since the rotor performs its functions. As Fig. 11 is a section perpendicular to the axis, the coil-sides are shown in section without their return bends. It is to be understood that the winding is made in the manner of the stator of an induction or synchronous motor, by forming the usual hexagonal coils of full or nearly full polar pitch, but including both primaries and secondaries, and laying them in the slots between the teeth 16b.

The design shown in Fig. 12 is appropriate for converters of higher capacity than those of the Fig. 11 type. The winding and core system of Fig. 12 is equivalent, in form and scale, to that shown in Fig. 7. The transformer 11' has coil units 13 on a core 11' with teeth 16', the coils P, S of the windings being subdivided and staggered for further reduction of magnetic leakage. Befitting the capacity of its stator, the rotor has a larger magnetic core 71' than that of Fig. 11, and has a larger energizing winding 74'.

If either transformer main winding of the converters of Figs. 11 or 12 is excited with polyphase current, the rotor may be started by shortcircuiting the windings of coils 74, 74', or 75, or by the torque of a squirrel-cage not shown, or even by the copper ring 76 on the interpole tips which serve to hold the coils 75 against centrifugal force. If the converter is serving as a direct-current to direct-current transformer, the rotor may be started and speed-stabilized by any appropriate means.

The converters in Figs. 11 and 12 are capable of the same operative combinations as in the rectangular transformers. Thus the conversion may be that of polyphase-current power to or from windings of the types in Fig. 1 or Fig. 2 matched with direct-current output or input through commutated systems of the type in Fig. 5 or the one in Fig. 6, or from direct-current to direct-current as in Fig. 8.

These and other attributes of flexibility of my improved converter will be obvious herefrom to those skilled in the art, as well as numerous variations of detail in construction that fall within the scope of the invention as set forth in the following claims.

I claim:

1. The method of transferring power between separate circuits wherein the current in at least one is unidirectional, which comprises commutating on at least one side of a closely coupled transformer, opposing one to another in the core of the transformer the magneto-motive forces of primary and secondary power currents during commutation in such wise that there is no flux change in the core caused by the commutation, and leading wattless alternating currents directly and without commutation into one of the windings of the transformer other than those conducting the said power currents.

2. The method of transferring power as claimed in claim 1, wherein the power currents on one side are alternating and flow through a plurality of parallel connected paths cooperatively to multiply the number of phases of transformation over the external number, by various vectorial additions of zigzag magnetomotive forces from the currents in the said paths.

3. The method of transferring power as claimed in claim 1, wherein the said wattless currents are of wave-form specific to make relatively flat-topped the shape of the voltage waves induced in the windings conducting the power currents.

4. The method of transferring power between separate circuits wherein the current in at least one is unidirectional, which comprises commutating on at least one side of a closely coupled transformer, opposing one to another in the core of the transformer the magnetomotive forces of primary and secondary power currents during commutation in such wise that there is no flux change in the core caused by the commutation, the currents in at least one winding being in a plurality of parallel paths; and leading wattless alternating currents directly and without commutation into one of the windings of the transformer other than those conducting the said power currents.

5. The method of converting power between alternating and direct currents which comprises transforming between primary and secondary windings formed by interconnecting closely coupled coils linked with a common, subdivided ferromagnetic core system, the winding on the alternating-current side being of the zigzag type; commutating the current on the direct-current side; and supplying wattless currents to a third winding on the said core system.

6. The method according to claim 5, wherein the wattless currents supplied impart to the voltage induced in each coil an approximately symmetrical flat-topped wave form.

7. The method according to claim 5, wherein the wattless currents supplied are of such wave form as will cause the voltage induced in each coil to approach a symmetrical flat-topped wave with low shoulders.

8. The method of converting power between alternating and direct currents which comprises transforming between primary and secondary polar windings of a transformer formed of coils closely coupled together in units mounted in a subdivided ferromagnetic structure; modifying by separate, non-sinusoidal induction the induced voltages within these coils to substantially flat-topped waves; and commutating the current on the direct-current side of the transformer.

9. The method of converting between alternating and direct currents which comprises transforming between primary and secondary polar windings of a transformer formed of coils closely coupled together in units mounted in a subdivided ferromagnetic structure; modifying by separate induction the induced voltages within these coils to waves having low shoulders; and commutating the current on the direct-current side of the transformer.

10. In apparatus for converting power between a polyphase alternating-current circuit and a direct-current circuit, a transformer having a plurality of unitary assemblies of coils connected respectively to said circuits, commutator means between the direct-current circuit and the coils associated therewith, and means for reducing sparking at said commutator means; said spark-reducing means comprising an additional coil in each unitary assembly, and means for supplying to said additional coils alternating currents shaped to impart to the voltages in the coils associated with the power circuits a wave form having low shoulders.

11. In apparatus for converting power between a polyphase alternating-current circuit and a direct-current circuit, the combination with a transformer having windings formed of coil units on a subdivided ferromagnetic core system, of commutating means associated with the direct-current power circuit and one of the windings; another of said windings being composed of coils grouped in a pair to each said unit, and the coils in some of said pairs being of unequal turns and connected to different phases of the polyphase power circuit; and a third one of said windings being composed of coils arranged one to each said unit and connected each to a separate phase of a synchronous exciter supplying wattless currents.

12. The method according to claim 8 wherein the modifying of the induced voltages is performed by introducing suitably shaped exciting currents into a third winding linked with the other two windings.

13. The method according to claim 8 wherein the modifying of the induced voltages is performed by synchronously moving across an open-slot face of the said ferromagnetic structure a polar field of magnetism of suitable wave-shape.

14. The method according to claim 8 wherein the commutating is effected in such wise as to cause the coils on the direct-current side to cooperate with each other in series.

15. The method of converting power between alternating and direct currents which comprises transforming between primary and secondary polar windings of a transformer having power windings formed of coils closely coupled in unitary assemblies on a ferromagnetic structure, imparting by separate induction to the voltages induced in said coils a substantially flat-topped wave form, and commutating in parallel the voltages on the direct-current side of the transformer.

16. In apparatus for converting power between currents of which at least one is unidirectional, a transformer comprising a ferromagnetic core, power windings divided into unitary assemblies each comprising closely coupled primary and secondary coils, commutator means connected to the coils of each power winding associated with unidirectional current, and separate inductive means for modifying the wave form of the induced voltage in the transformer windings to preclude sparking at said commutator means.

17. In apparatus for converting power between currents of which at least one is unidirectional, a transformer comprising a ferromagnetic core, power windings thereof divided into unitary assemblies each comprising closely coupled primary and secondary coils, commutator means connected to the coils of each power winding associated with unidirectional current, a tertiary winding comprising a coil in each unitary assembly and closely coupled to the primary and secondary windings thereof, and means for supplying to said tertiary winding alternating currents of wave-form effective to suppress sparking at said commutator means.

18. In apparatus for converting power between currents of which at least one is unidirectional, a transformer comprising a circular stator, power windings on said stator and divided into unitary assemblies each comprising closely coupled primary and secondary coils, commutator means connected to the coils of each power winding associated with unidirectional current, and means to preclude sparking at said commutator means; said spark-precluding means comprising a rotor having pole pieces each of fixed magnetic polarity and movable along said unitary assemblies.

19. In apparatus for converting power between currents of which at least one is unidirectional, a transformer comprising a ferromagnetic core, a plurality of unitary coil assemblies each including a primary and a secondary winding asociated with a tertiary winding, circuit connections including commutator means associated with each direct-current power circuit for leading currents to and from said primary and secondary windings, and means for supplying to said tertiary winding alternating currents of wave-form to assist in suppressing flux change in said core by the action of said commutator means, thereby to preclude sparking at said commutator means.

20. In apparatus for converting power between an alternating and a direct-current power circuit, the combination with a transformer and unitary coil assemblies thereon, each coil assembly comprising at least three coils, of circuit connections between one coil of each unitary assembly and one power circuit, circuit connections between a second coil of each unitary assembly and the other power circuit, the circuit connections between the direct-current power circuit and its associated coils including commutator means, and means for supplying to another coil of each unitary assembly an alternating current of wave-form that precludes sparking at said commutator means.

21. In apparatus for converting power between an alternating-current and a direct-current power circuit, the invention as claimed in claim 20, wherein the alternating current circuit is a multi-phase power circuit and each of said unitary assemblies includes four coils, and the circuit connections between said alternating current power circuit extend to two coils of each unitary asembly.

22. In apparatus for converting power between an alternating-current and a direct-current power circuit, the invention as claimed in claim 20, wherein said circuit connections between one power circuit and its associated coils connect the said coils in series.

23. In apparatus for converting power between an alternating-current and a direct-current power circuit, the invention as claimed in claim 20, wherein said circuit connections between one power circuit and its associated coils connect the said coils in parallel.

24. In apparatus for converting power between a polyphase alternating-current circuit and a direct-current circuit, a transformer having a plurality of unitary assemblies of coils connected respectively to said circuits, commutator means between the direct-current circuit and the coils associated therewith, and means for reducing sparking at said commutator means; said spark-reducing means comprising an additional coil in each unitary assembly, and means for supplying to said additional coils alternating currents to impart a flat-topped wave form to the voltages induced in the coils associated with the power circuits.

GEORGE T. SOUTHGATE.